A. W. HARRIS.
PLANT GUARD.
APPLICATION FILED MAY 15, 1919.
1,324,668.
Patented Dec. 9, 1919.
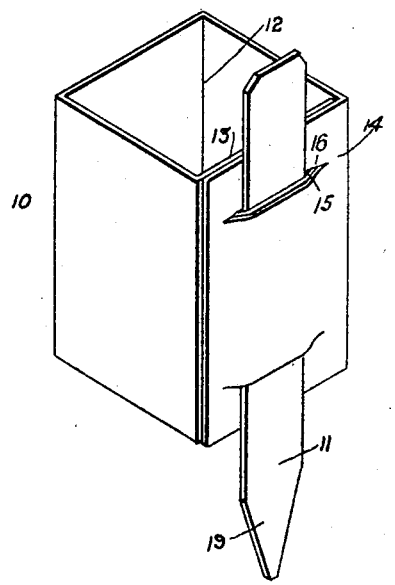
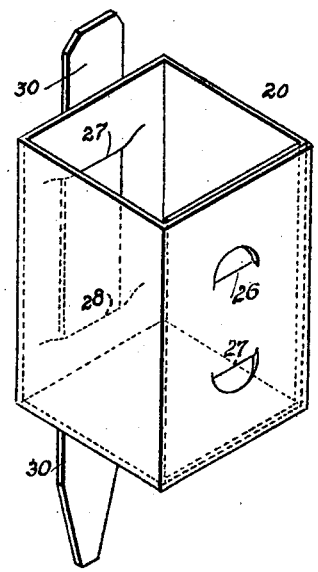
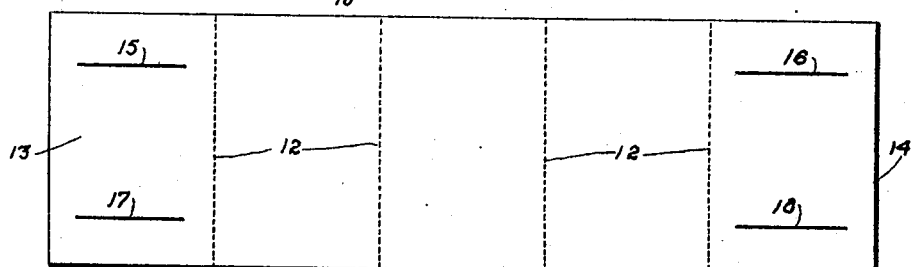
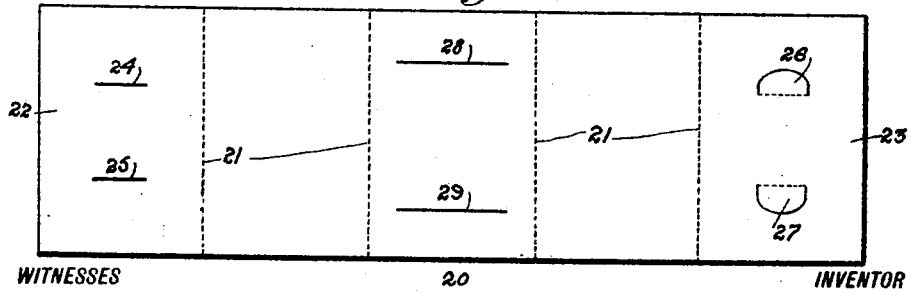
WITNESSES
INVENTOR
A. W. Harris,
BY
ATTORNEYS

UNITED STATES PATENT OFFICE.

ARTHUR W. HARRIS, OF SLEEPY EYE, MINNESOTA.

PLANT-GUARD.

1,324,668.    Specification of Letters Patent.    Patented Dec. 9, 1919.

Application filed May 15, 1919. Serial No. 297,182.

*To all whom it may concern:*

Be it known that I, ARTHUR W. HARRIS, a citizen of the United States, and a resident of Sleepy Eye, in the county of Brown and State of Minnesota, have invented a new and Improved Plant-Guard, of which the following is a full, clear, and exact description.

The invention relates to garden and field implements and devices, and its object is to provide a new and improved plant guard arranged to permit of readily placing it in position on the ground around a growing plant to prevent cutworms and other insects from reaching and injuring or destroying the plant. Another object is to provide a guard which when in position is not liable to be disturbed by severe winds or rains.

With these and other objects in view, the invention consists of certain novel features of construction, as hereinafter shown and described and then specifically pointed out in the claim.

A practical embodiment of the invention is represented in the accompanying drawings forming a part of this specification, in which similar characters of reference indicate corresponding parts in all the views.

Figure 1 is a perspective view of the plant guard;

Fig. 2 is a view of the guard body in extended position;

Fig. 3 is a perspective view of a modified form of the plant guard; and

Fig. 4 is a plan view of the extended body of the guard shown in Fig. 3.

The plant guard in its general construction consists of a tubular body 10 and an anchoring member 11, of which the body 10 is set on the ground and surrounds the growing plant, and the anchoring member 11 serves to securely hold the body in position on the ground. As shown in Figs. 1 and 2, the body 10 is preferably made of a single piece of thin cardboard or similar sheet material (see Fig. 2) provided with vertically disposed creases 12 to permit of readily bending the sheet into a body 10 of square shape, open at the top and bottom, and with the ends 13 and 14 overlapping one the other. The ends 13 and 14 are provided with horizontally disposed registering slots 15, 16 and 17, 18 through which is threaded the anchoring member 11, as plainly shown in Fig. 1. The anchoring member 11 is preferably in the form of a pot or plant label usually made of a piece of flat wood or other material and having a pointed lower end 19 to permit of conveniently threading the label through the registering slots 15, 16 and 17, 18 and to permit of conveniently pushing this pointed end 19 into the ground to securely hold the body 10 in upright position on the ground and around a growing plant. The name of the plant protected by the guard is usually written or otherwise produced on the anchoring member 11. In practice, the lower end of the body 10 is pushed about half an inch into the ground as some of the cutworms are active near the surface of the ground as well as above ground. It is understood that the anchoring means 11 is threaded through the registering slots 15, 16, 17 and 18 on the outer face of the end 14 so as not to interfere in the least with the growing plant inside of the body.

In the modified form shown in Figs. 3 and 4, the body 20 is formed of a single piece of sheet material provided with vertical creases 21 to permit of readily bending the sheet into a body of square shape, open at the top and bottom, and with the ends 22 and 23 arranged in overlapping relation. The end 22 in this case is provided with horizontally disposed slots 24, 25, and the end 23 is provided with struck-up locking lugs 26 and 27 adapted to pass through the slots 24, 25 to fasten the ends 22, 23 together in overlapped relation thereby providing one side of the body 20. One of the other sides, preferably the one directly opposite the one formed of the overlapping ends 22, 23, is provided with horizontally disposed slots 28, 29 through which is threaded the anchoring member 30, similar to the anchoring member 11, so that further description of the same is not deemed necessary.

It will be noticed that the tubular body 10 can be conveniently and cheaply manufactured and while in flat condition can be readily shipped together with the anchoring member 11 and the parts can be readily assembled by the user and placed in position on the ground.

It will be noticed that the anchoring member 11 securely holds the body in place so that the latter is not liable to be disturbed by severe winds or rains.

Having thus described my invention, I claim as new and desire to secure by Letters Patent:—

A plant guard, comprising a body of a single piece of sheet material and polygonal in plan, the body being open at the top and bottom, one of the sides having spaced horizontally disposed slots, and a flat post threaded through the said slots and having a pointed lower end projecting below the lower edge of the said body.

ARTHUR W. HARRIS.